US012077360B2

(12) United States Patent
Deis et al.

(10) Patent No.: US 12,077,360 B2
(45) Date of Patent: Sep. 3, 2024

(54) SUPPLY OF CUSHIONING MATERIAL FOR WRAPPING AT LEAST ONE OBJECT

(71) Applicant: Storopack Hans Reichenecker GmbH, Metzingen (DE)

(72) Inventors: Paul Deis, Preuschdorf (FR); Jean-Marc Slovencik, Rosenfeld (DE)

(73) Assignee: Storopack Hans Reichenecker GmbH, Metzingen (DE)

( * ) Notice: Subject to any disclaimer, the term of this patent is extended or adjusted under 35 U.S.C. 154(b) by 188 days.

(21) Appl. No.: 17/369,033

(22) Filed: Jul. 7, 2021

(65) Prior Publication Data
US 2022/0017280 A1    Jan. 20, 2022
US 2023/0348166 A9    Nov. 2, 2023

(30) Foreign Application Priority Data
Jul. 15, 2020    (EP) .................................... 20186031

(51) Int. Cl.
*B65D 81/03*    (2006.01)
*B32B 3/28*    (2006.01)
(Continued)

(52) U.S. Cl.
CPC ................ *B65D 81/03* (2013.01); *B32B 3/28* (2013.01); *B32B 7/06* (2013.01); *B32B 7/14* (2013.01);
(Continued)

(58) Field of Classification Search
CPC .............................................. B65D 2581/053
See application file for complete search history.

(56) References Cited

U.S. PATENT DOCUMENTS 3,288,353 A     11/1966  McCullough
5,050,909 A  *   9/1991  Mertens .................... B41L 1/24
                                                      283/117
(Continued)

FOREIGN PATENT DOCUMENTS

DE         1675907 U    5/1954
DE         1894663 U    6/1964
(Continued)

OTHER PUBLICATIONS

"What is Kraft Paper and What Makes it So Popular?," Andrew Jacobs, retrieved from JAM Paper and Envelope website https://www.jampaper.com/blog/what-is-kraft-paper/. (Year: 2013).*

(Continued)

*Primary Examiner* — Ian A Rummel
(74) *Attorney, Agent, or Firm* — Wood Herron & Evans LLP

(57) ABSTRACT

A supply of cushioning material for wrapping at least one object comprises a stack formed of a multitude of prefabricated sheets of three-dimensional cushioning material. The invention proposes that adjacent sheets are connected to each other by means of a releasable adhesive system, the adhesive system being designed such that the connection can be released without auxiliary means, i.e. without special heat exposure and without chemicals and without special tools simply by mechanical action, and non-destructively, i.e. without damaging the cushioning material.

13 Claims, 2 Drawing Sheets

Figure 1:
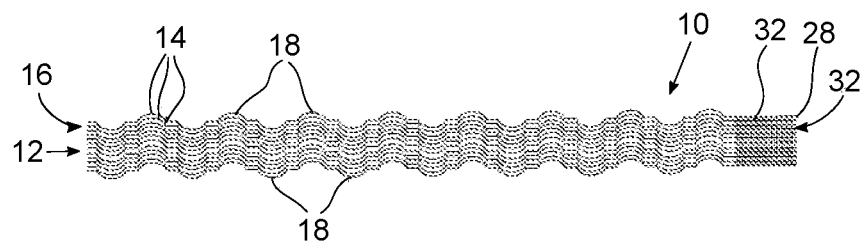

(51) Int. Cl.
*B32B 7/06* (2019.01)
*B32B 7/14* (2006.01)
*B32B 29/00* (2006.01)

(52) U.S. Cl.
CPC ........ *B32B 29/005* (2013.01); *B32B 2553/02* (2013.01); *B65D 2581/053* (2013.01)

(56) References Cited

U.S. PATENT DOCUMENTS

| | | | |
|---|---|---|---|
| 6,286,871 B1 * | 9/2001 | Spector | ............. G09F 3/10 283/67 |
| 2013/0216788 A1 | 8/2013 | Schellenberger | |

FOREIGN PATENT DOCUMENTS

| | | |
|---|---|---|
| EP | 0904955 A1 | 3/1999 |
| EP | 1185568 A2 | 3/2002 |
| FR | 3072367 A1 | 4/2019 |
| WO | 2000063265 A3 | 7/2001 |
| WO | 2012164963 A1 | 12/2012 |
| WO | 2019020631 A1 | 1/2019 |

OTHER PUBLICATIONS

EP 20 18 6031 European Search Report dated Jan. 12, 2021.

\* cited by examiner

SUPPLY OF CUSHIONING MATERIAL FOR WRAPPING AT LEAST ONE OBJECT

This Application claims the priority benefit of European Patent Application No. 20 186 031.9-1016 filed on Jul. 15, 2020, which is hereby incorporated by reference herein as if fully set forth in its entirety.

The invention relates to a supply of cushioning material for wrapping at least one object according to the preamble of the first claim.

It is known to protect objects to be transported or shipped from impacts or other harmful external influences by wrapping these objects with a cushioning material. Such a cushioning material can be, for example, a bubble wrap made of plastic, or another three-dimensional cushioning material, which for example has bulges similar to an egg carton.

International patent publication WO 2019/020631 A1 discloses a cushioning paper material for packaging purposes having a cushioning portion comprising a plurality of convex protrusions and concave recesses. The cushioning paper material may be supplied from a box where it is stored as a web type material which is folded in a zigzag manner. Similar cushioning materials having protrusions and recesses are disclosed in DE 1 894 663 U, DE 1 675 907 U, and U.S. Pat. No. 3,288,353 A.

It is an object of the present invention to provide a supply of cushioning material which is easily to handle and can be supplied quickly.

This object is achieved by means of a supply having the features of the independent claim. Further embodiments are indicated in dependent claims.

The supply of cushioning material according to the invention is formed by a stack of prefabricated sheets of three-dimensional cushioning material, the sheets of the stack being attached to each other by an adhesive system rather than by a zigzag fold. In order to remove a sheet from the stack it is therefore no more necessary to tear off the sheet at the zigzag fold line, which often may result in improper separation and which requires two hands, one for tearing the sheet off and the other for holding the remainder back. Instead, a user may remove a sheet simply by lifting it off from the remainder of the stack. However, for example during transport of the stack from a cushioning material manufacturing site to a location where the cushioning material is used for wrapping objects, the connection of the sheets by means of the adhesive system prevents the sheets from being unstacked inadvertently. This allows for example to omit a solid box for transporting the stack of cushioning material.

More precisely, the invention proposes a supply of cushioning material for wrapping at least one object. This type of cushioning material is generally described for example in international patent publication WO 2019/020631 A1. By way of example, such a cushioning material may be used for wrapping a fragile object prior to placing the object in a container for shipping.

The inventive supply of cushioning material comprises a stack formed of a multitude of prefabricated sheets of three-dimensional cushioning material. The term "sheet" means that the cushioning material when it is stored in the supply according to the invention is a generally flat element, which means that the thickness is much less than either of the other two Cartesian dimensions. However, the term "three-dimensional" indicates that each sheet has at least portions having a distinctive thickness providing the elasticity which is necessary for providing the required cushioning properties.

According to the invention adjacent sheets are connected to each other preferably in the region of at least one edge by means of a releasable adhesive system. However, it is to be understood that the adhesive system may be arranged alternatively or additionally at a different location of a sheet, for example in one or more corner regions or in a centre region of a sheet. If the adhesive system is arranged in the region of at least one edge of a sheet, it is possible to easily combine two or more sheets such that a cushioning material having larger dimensions than a single sheet in order to wrap an article for which one single sheet is not long and/or wide enough. Also, with the adhesive system being arranged in the region of at least one edge of a sheet, after wrapping a free outer edge of a sheet may be fixed to the underlying region of the sheet. Furthermore, the specific adhesive system allows to fix the cushioning material to the article intended to be protected without damaging the article itself. This is particular advantageous in the case of product shapes which are difficult to be wrapped in a classical/conventional way. Finally, instead of having to wrap the product several times so that the cushioning material sticks on itself, one single sheet can be fixed upon itself and therefore protect economically a small product.

The adhesive system may be provided in the form of an adhesive layer which is applied to a surface region of a sheet. Preferably, such an adhesive layer is applied to the surface region of a sheet in the vicinity of a free edge of the sheet such that adjacent, opposite and parallel surface regions of adjacent sheets are connected to each other.

The adhesive system is designed such that the connection can be released without any auxiliary means, simply by mechanical action, that is simply by lifting the sheet off from the remainder of the stack for example manually by means of a hand of a user. In order to separate a sheet from the remainder of the stack, it is therefore not necessary to apply heat or chemicals or to use special tools, such as knifes or the like, or to tear off the sheet by breaking the material at a specific line of perforations or the like.

In a further embodiment hereto the releasable adhesive system has an adhesive layer with an adhesive note adhesion effect, for example à la Post-it®. Such an adhesive principle is well known from those adhesive layers that have a so-called "sticky note adhesive effect", for example from notepads known on the market under the brand name "Post-it®". The adhesive used for this is a cured plastic consisting of tiny beads with fine hairs. These hairs act like tentacles that hold the notepad (or in the present case the surface of one sheet of cushioning material) to the adjacent surface (or in the present case the adjacent and parallel surface of the adjacent sheet of cushioning material). The sheet of cushioning material can be easily removed again, as the contact surface between two adjacent sheets is reduced by the small beads. If the hairs in question do not break off or become soiled with dust, such a sheet of cushioning material can be stuck to a surface many times, detached from it, stuck to another surface again, detached again, etc.

In a further embodiment the supply comprises sheets of three-dimensional cushioning material each having a plurality of embossed protrusions. This type of cushioning material is lightweight and provides superior cushioning properties.

In a further embodiment hereto the sheets comprise a plurality of creases created during or prior to embossing the protrusions. Such creases reduce the risk of tearing or damaging the material when embossing the protrusions. This type of cushioning material therefore is particularly solid.

In a further embodiment the supply comprises sheets each having at least one perforation line allowing to separate a portion of the sheet along the perforation line from a remainder of the sheet. This increases the flexibility when using the cushioning material because the size of the cushioning material can be easily adapted to the size of the object to be wrapped.

In a further embodiment hereto the supply comprises sheets each having a plurality of perforation lines. This further increases the flexibility during use of the cushioning material.

In a further embodiment hereto the supply comprises sheets each having a plurality of perforation lines wherein at least two of the perforation lines are not parallel to each other, preferably are orthogonal to each other. Such perforation lines not only allow to adapt the length of the cushioning material used for wrapping an object but also the width of the sheet.

In a further embodiment the sheets comprise a paper material, preferably craft paper material, still more preferably recycled craft paper material. The use of paper material is preferable from an ecological standpoint.

The supply may comprise sheets having at least two layers which are non-releasably fixed to each other. One layer may provide the cushioning properties, the other layer may provide an optical aspect. Such a cushioning material therefore may create a specific "unboxing experience" to a user who is unwrapping a wrapped object.

The supply may comprise sheets wherein an adhesive layer of the adhesive system is formed as a straight line, an undulated line, or by a plurality of adhesive points.

Figure 2:
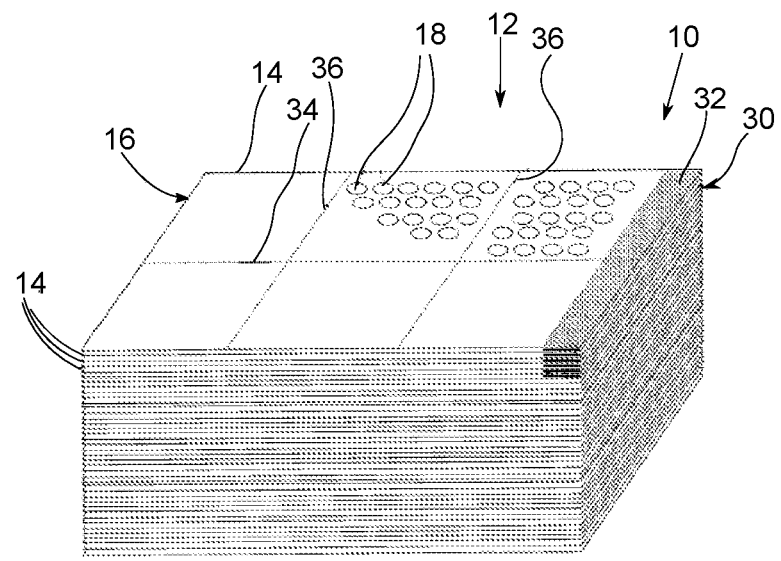
Figure 3:
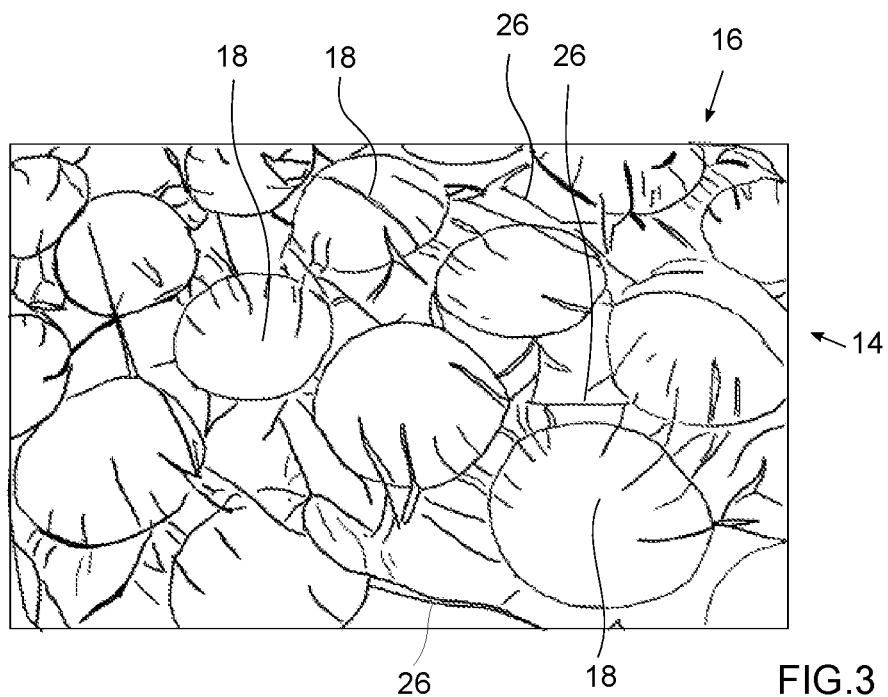
Figure 4:
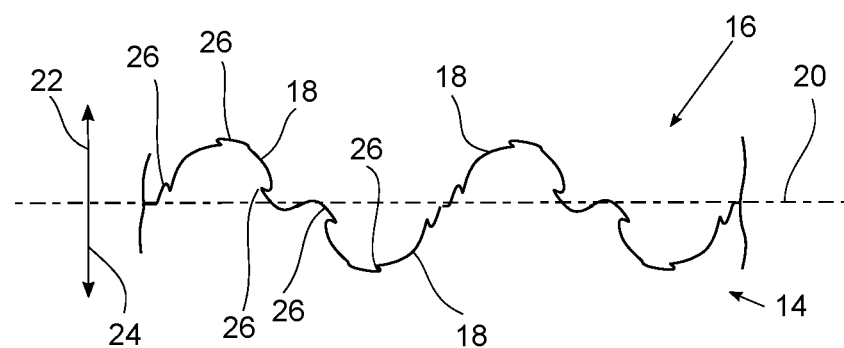

The invention now will be described with reference to the attached drawing. In the drawing is FIG. 1 a schematic sectional view of a supply of cushioning material in the form of a stack formed of a multitude of prefabricated sheets of three-dimensional cushioning material;

FIG. 2 a perspective view of the supply of FIG. 1;

FIG. 3 a perspective partial view of a prefabricated sheet of three-dimensional cushioning material of the supply of FIG. 1; and FIG. 4 a schematic sectional view of the sheet of FIG. 3.

It is to be noted that for the sake of clarity in the figures only exemplary but not all elements and portions or regions are designated with reference signs.

In the figures, a supply of cushioning material generally has the reference sign 10. The supply 10 comprises a stack 12 formed of a multitude of prefabricated sheets 14 of three-dimensional cushioning material 16. The sheets 14 are arranged horizontally and parallel to each other on top of each other like a pile.

As can be seen from the figures, a sheet 14 of cushioning material 16 is generally flat. It comprises a plurality of embossed protrusions 18. The embossed protrusions 18 extend from a reference or middle plane 20 (FIG. 4) in a first direction 22 and in a second direction 24, the second direction 24 being opposite to the first direction 22. Both directions 22 and 24 are orthogonal to the reference or middle plane 20.

By consequence, while a sheet 14 of cushioning material 16 is generally flat with a thickness D which is low compared to its length and width, the thickness D (FIG. 4) is distinct enough for providing the elasticity necessary for providing the required cushioning properties. The positions of the embossed protrusions 18 are arranged in an alternating order. The embossed cushioning material 16 further comprises a plurality of creases 26 (FIGS. 3 and 4).

In the present exemplary embodiment the embossed cushioning material 16 is made from craft paper. It is particularly preferred that the embossed cushioning material 16 is made from recycled craft paper. The sheets 14 of cushioning material 16 are prefabricated which means that the protrusions 18 are embossed for example into a web type and flat starting material which is then cut into the rectangular sheets 14 of FIGS. 1 and 2.

In the present exemplary embodiment a cross sectional shape, when viewed from the side (FIGS. 1 and 4), of the embossed protrusions 18 is approximately half-circular. Furthermore, in the present exemplary embodiment a cross sectional shape, when viewed from above (FIGS. 2 and 3), of the embossed protrusions 18 is approximately circular.

As can be seen from 1 and 2, adjacent sheets 14 are connected to each other in the region of, by way of example, the right free edge 28 of the sheets 14 by means of a releasable adhesive system 30. The adhesive system 30 comprises an adhesive layer 32 applied to a surface region adjacent to the free edge 28 of each sheet 14 prior to forming the stack 12 of sheets 14. The adhesive system 30 is designed such that the connection between adjacent sheets 14 can be released without any auxiliary means, i.e. without special heat exposure and without chemicals and without special tools simply by mechanical action, and non-destructively, i.e. without damaging the cushioning material. The mechanical action may consist in simply lifting a sheet 14 off from the remainder of the stack 12 for example manually by means of a hand of a user.

The adhesive layer 32 may have an adhesive note adhesion effect, for example à la Post-it®. Such an adhesive principle is well known from those adhesive layers that have a so-called "sticky note adhesive effect", for example from notepads known on the market under the brand name "Post-it®". The adhesive used for this is a cured plastic consisting of tiny beads with fine hairs. These hairs act like tentacles that in the present case hold the surface of one sheet 14 of cushioning material 16 to the adjacent and parallel surface of the adjacent sheet 14 of cushioning material 16. The sheet 14 of cushioning material 16 can be easily removed again, as the contact surface between two adjacent 14 sheets is reduced by the small beads.

As can be seen from FIG. 2, each sheet has a plurality of transverse and longitudinal perforation lines 34 and 36 allowing to separate a portion 38 of the sheet 14 along the perforation lines 34 and/or 36. The transverse perforation lines 36 are orthogonal to the longitudinal perforation line 34. As can be seen from FIG. 2, in the region of the perforation lines 34 and 36 no embossed protrusions 18 are provided.

While not shown in the figures, it is possible that the stack of prefabricated sheets of cushioning material is presented to a user in a box mounted on a swivelling arm having one or more articulations, which allows to place the supply for example over a working table of a user and allows to easily move the supply to the desired position.

LIST OF REFERENCE NUMERALS 10 supply
12 stack
14 sheets
16 cushioning material
18 embossed protrusions 20 middle plane
22 first direction
24 second direction
26 creases
28 edge
30 adhesive system
32 adhesive layer
34 longitudinal perforation line
36 transverse perforation lines
38 portion of sheet

The invention claimed is:

1. A supply of cushioning material for wrapping at least one object, which comprises a stack formed of a multitude of prefabricated sheets of three-dimensional cushioning material, wherein adjacent sheets are connected to each other in the region of at least one edge by a releasable adhesive system, the adhesive system being designed such that the connection can be released without special heat exposure, chemicals, or special tools, simply by mechanical action without damaging the cushioning material, wherein the sheets of three-dimensional cushioning material each have a plurality of embossed protrusions, and wherein the region where the adjacent sheets are connected to each other by the releasable adhesive system is free of protrusions.

2. The supply of claim 1 wherein the releasable adhesive system has an adhesive layer with an adhesive note adhesion effect.

3. The supply of claim 1 wherein the sheets comprise a plurality of creases created during or prior to embossing the protrusions.

4. The supply of claim 1 wherein the sheets each have at least one line of weakened material strength, allowing to separate a portion of the sheet from the remainder along the line.

5. The supply of claim 1 wherein the sheets comprise a paper material.

6. The supply of claim 1 wherein an adhesive layer of the adhesive system is formed as a straight line, an undulated line, or by a plurality of adhesive points.

7. The supply of claim 4 wherein the at least one line of weakened material strength is a perforation line.

8. The supply of claim 7 wherein the sheets each have a plurality of perforation lines.

9. The supply of claim 8 wherein at least two of the perforation lines are not parallel to each other.

10. The supply of claim 9 wherein the at least two of the perforation lines are orthogonal to each other.

11. The supply of claim 5 wherein the paper material is kraft paper material.

12. The supply of claim 11 wherein the kraft paper material is recycled craft paper material.

13. A supply of cushioning material for wrapping at least one object, which comprises a stack formed of a multitude of prefabricated sheets of three-dimensional cushioning material, wherein adjacent sheets are connected to each other by a releasable adhesive system, the adhesive system being designed such that the connection can be released without special heat exposure, chemicals, or special tools, simply by mechanical action without damaging the cushioning material, wherein the sheets are connected to each other by the releasable adhesive system in at least one of an edge region, a corner region, and a center region of the sheet, wherein the sheets of three-dimensional cushioning material each have a plurality of embossed protrusions, and wherein the region where the adjacent sheets are connected to each other by the releasable adhesive system is free of protrusions.

* * * * *